United States Patent

[11] 3,599,237

[72] Inventor Jean Victor Martens
Deurne-Zuid, Switzerland

[21] Appl. No. 776,474
[22] Filed Nov. 18, 1968
[45] Patented Aug. 10, 1971
[73] Assignee International Standard Electric Corporation
New York, N.Y.
[32] Priority Dec. 27, 1967
[33] Belgium
[31] 47,535

[54] MODULATOR AND FREQUENCY MODULATED PHASE-SHIFT OSCILLATOR ARRANGEMENT
9 Claims, 1 Drawing Fig.

[52] U.S. Cl. .......... 332/23, 325/156
[51] Int. Cl. .......... H03c 3/00
[50] Field of Search .......... 325/139, 156; 331/117, 135, 168, 179; 332/23

[56] References Cited

UNITED STATES PATENTS

| | | | |
|---|---|---|---|
| 3,027,522 | 3/1962 | Boxall et al. | 332/44 |
| 3,054,971 | 9/1962 | Khu | 331/179 X |
| 3,184,689 | 5/1965 | Wylde | 331/135 X |

*Primary Examiner*—Roy Lake
*Assistant Examiner*—Lawrence J. Dahl
*Attorneys*—C. Cornell Remsen, Jr., Walter J. Baum, Percy P. Lantzy, Philip M. Bolton, Isidore Togut and Charles L. Johnson, Jr.

ABSTRACT: A circuit arrangement is provided having first and second signal transducing circuits with parallel outputs, a first input signal is applied to the inputs of both of said circuits and a second input signal is applied at least to one of said circuits, whereby said second input signal is applied at least to said input of said first circuit where it is superposed to said first input signal.

PATENTED AUG 10 1971 3,599,237
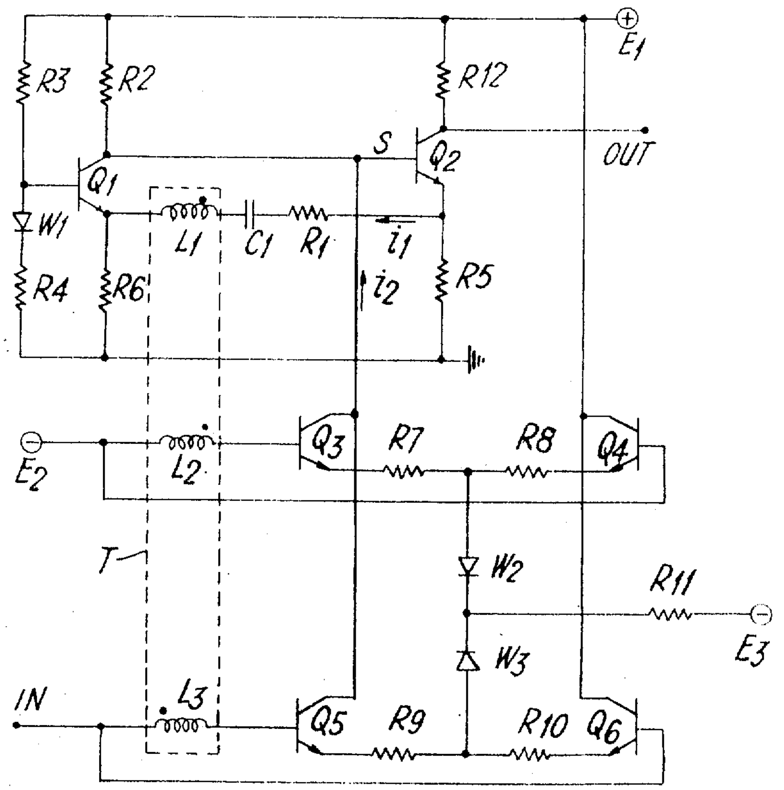
Inventor
JEAN VICTOR MARTENS
By [signature]
Attorney

MODULATOR AND FREQUENCY MODULATED PHASE-SHIFT OSCILLATOR ARRANGEMENT

BACKGROUND OF THE INVENTION

The present invention relates to a modulator including first and second signal transducing circuits with paralleled outputs, a first input signal being applied to the inputs of both said first and second circuits and a second input signal being applied at least to one of said circuits.

Such a modulator is disclosed in the U.S. Pat. No. 3,027,522 or in the Belgian Pat. No. 682,909 (J. MARTENS 25). Such modulators are in fact of the double balanced type having the advantage that both input signals are substantially eliminated from the output circuit in which only the modulation products appear. These known solutions imply however that, e.g. in the case of the above U.S. patent the two input signals are applied to separate inputs of the two circuits so that either two push-pull input transformers are necessary or alternatively said circuits must use symmetrical transistors of opposite conductivity type. In the case of the Belgian patent the arrangement requires additional transistors in order to provide distinct input terminals for the second input signal voltage and these also imply the provision of accurate biasing means.

SUMMARY OF THE INVENTION

A general object of the invention is to provide a new modulator of the above type and particularly a simple arrangement of the double balanced type.

In accordance with the main characteristic of the invention, in a modulator as initially defined, said second input signal is applied at least to said input of said first circuit where it is superposed to said first input signal.

In accordance with a further characteristic, the input of said second circuit is coupled to a fixed DC potential whose level is situated between the upper and lower levels of said second input signal and said circuits are intercoupled so as to be alternately effective depending on whether said upper or said lower level is applied.

In this manner, two-push-pull transformers or additional transistors are no longer necessary. Moreover, with the new arrangement, if the first input signal is readily available in two opposite phases, the two circuits can be identical. Furthermore, whereas in the U.S. Patent one avoids difficulties with a change of DC level at the input being reproduced at the output due to the fact that no DC biasing voltages are employed, this implies that the operation is dependent on the level variations of the second input voltage acting as carrier or switching voltage. On the other hand in the new circuit, one may use as in the case of the Belgian patent long-tail transistor pairs for each of the two circuits, with the result that the substantially constant current, fed to the two emitters in each pair, will not permit any substantial DC shift at the collector output in response to undesired changes in the DC biasing level at the base input.

The present invention also relates to a frequency modulated phase-shift oscillator arrangement including a double balanced modulator controllable by a modulation input signal to add to the feedback signal of the oscillator main feedback loop, a secondary signal which is substantially in quadrature with respect to the main signal.

Such a frequency modulated phase-shift oscillator arrangement is known from the Belgian Pat. No. 525,820. This known arrangement particularly well adapted to frequency-shift VF telegraphy is however relatively costly and bulky particularly at the lower frequencies encountered in telegraph systems, since it requires two separate transformers in its modulator circuit.

Another object of the present invention is to provide an improved frequency modulated phase-shift oscillator arrangement of the above type, which does not present the mentioned drawback.

According to another aspect of the invention the frequency modulated phase-shift oscillator arrangement defined as above, is characterized by the fact, that said oscillator incorporates a coil in its frequency determining circuit, said coil including at least one additional winding to feed said double balanced modulator.

According to an alternative aspect, the previously defined frequency modulated phase-shift oscillator arrangement, is characterized by the fact that said modulator is of the type aforedefined.

BRIEF DESCRIPTION OF THE DRAWINGS

The above-mentioned and other objects and features of the invention will become more apparent and the invention itself will be best understood by referring to the following description of an embodiment taken in conjunction with the sole FIGURE in which there is shown a frequency modulated phase-shift oscillator arrangement in accordance with the invention.

DESCRIPTION OF THE PREFERRED EMBODIMENT

Referring to the figure, the frequency modulated phase-shift oscillator arrangement shown therein comprises two parts: an oscillator circuit and a modulator circuit, the arrangement being assumed to form part of the transmitting terminal of a telegraph station.

The oscillator circuit includes two NPN transistors Q1 and Q2 whose emitters are interconnected via a series RLC circuit comprising a resistance R1, a capacitor C1 and an inductor L1, the latter being constituted by the primary winding of a transformer T. The emitters of transistors Q1 and Q2 are further connected to ground via the respective resistances R6 and R5. The collectors of transistors Q1 and Q2 are connected to a source of positive DC potential $E1$, e.g. $E1$=24 Volts, via the respective resistances R2 and R12, the collector of transistor Q1 being further connected to the base of transistor Q2. The base of transistor Q1 is connected, on the one hand to the source $E1$ via a resistance R3 and on the other hand to ground via the series connection of a diode W1 and a resistance R4. Diode W1 stands for temperature compensating purpose of the base-emitter junction of transistor Q1. The output of the oscillator arrangement is taken from the collector of transistor Q2.

The modulator circuit comprises two long-tail transistor pairs Q3/Q4 and Q5/Q6. The collectors of transistors Q3 and Q5 are connected to the collector of transistor Q1, whereas the collectors of transistors Q4 and are connected to the source $E1$. The emitters of transistors Q3 and Q4 (Q5 and Q6) are interconnected via individual resistances $R7$ and $R8$ ($R9$ and $R10$), the junction of resistances $R7$ and $R8$ ($R9$ and $R10$; $R7$=$R8$=$R9$=$R10$) being connected to a source $E3$ of negative DC potential, e.g. $E3$=−24 Volts, via a decoupling diode W2 (W3) and a resistor R11 simulating a current source. The transformer T has two secondary windings L2 and L3 with equal number of turns, which are connected across the bases of transistor pairs Q3/Q4 and Q5/Q6 respectively. As indicated by the black dots the winding L2 is wound in the same sense as primary winding L1, whereas winding L3 is wound in the opposite sense. The junction of the base of transistor Q4 with winding L2 is connected to a reference source of negative potential E2, e.g. $E2$=−0.5 Volts.

The junction of the base of transistor Q6 with winding L3 constitutes the input of the arrangement referred to as IN, to which are applied modulation signals. These modulation signals are constituted by DC pulses of which the ON and OFF potential levels are for instance equal to +1 Volt and −2 Volts respectively, i.e. symmetrically arranged about the reference potential E2 of −0.5 Volt. In this way, if the DC input voltage applied to the transistor pair Q5/Q6 is more positive than the reference DC voltage E2 applied to the transistor pair Q3/Q4, i.e. if an ON-pulse is applied to the pair Q5/Q6, then the transistor pair Q5/Q6 becomes active, whereas pair Q3/Q4 is cut off. The constant current supplied via resistance R1 only flows through the transistor pair Q5/Q6. If the above input DC voltage is lower than the reference voltage E2, i.e. if an OFF-pulse is applied to the transistor pair Q5/Q6, then the latter pair is cut off, whereas the pair Q3/Q4 becomes active.

The operation of the arrangement is based on the principle that in an oscillator circuit, symmetrical frequency shifts (with respect to the oscillator nominal frequency) can be obtained by superposing to the feedback signal of its main feedback loop, a secondary signal which is 90 degrees lagging or leading with respect to that of the main loop. The secondary signal is derived by taking advantage of the fact that the sinusoidal current of the oscillator main feedback loop is in quadrature with the voltage developed across the inductor L1 or capacitor C1 thereof. In this way, the AC input voltage to the transistor pairs Q3/Q4 and Q5/Q6, which is supplied thereto by the secondary windings L2 and L3 of transformer T is +90° and −90° out of phase respectively, with regard to the current *i*1 circulating in the tank circuit R1C1L1 of the oscillator main feedback loop. The above AC input voltage signals supplied by windings L2 and L3, have an amplitude of the order of e.g. 1V, which is comparable to the level of the modulation input signal. Diodes W2 and W3 decouple the AC emitter signals of the transistor pairs Q3/Q4 and Q5/Q6 during the switching of the modulator from its one condition to the other or more particularly during the transient period at which the modulating signal voltage is close to the reference potential of −0.5 Volt. The current *i*2 (AC component), supplied through the common connection of the collectors of transistors Q3 and Q5, is thus either +90° or −90° out of phase, with respect to the current *i*1, depending on which transistor pair Q3/Q4 or Q5/Q6 is active. This current i2 is superposed to the collector current of transistor Q1, which is substantially equal to the current i1, to build up the voltage across the resistance R2. Hence, under the influence of the secondary current *i*2, the oscillation frequency is shifted by an amount *s* in the one or other direction with respect to the resonant frequency *f* of the oscillator tank circuit, depending on which transistor pair Q3/Q4 or Q5/Q6 supplies the current *j*2. In order to adjust the current *i*2 to the required value and hence the oscillator frequency shift at the required value *s*, potentiometer resistances P1 and P2 (not shown) may be connected across the resistance pairs R7/R8 and R9/R10 respectively.

The relation between the frequency shift *s*, the nominal frequency *f* and the component values, will be derived hereinafter from the oscillation condition, i.e. for any condition of the modulation circuit the total amount of feedback $\mu\beta=G$ of the arrangement should be equal to 1.

The above-amount of feedback *G* is determined by splitting the loop in point S, by applying an AC voltage *V*1 to the base of transistor Q2 and by calculating the voltage $V_2$ appearing across the resistance $R_2$. The amount of feedback *G* is then equal to $V_2/V_1$.

The reactance X of the series connection of inductor $L_1$ and capacitor $C_1$ is given by the following relation:

$$X=WL_1\left(1-\frac{1}{W^2L_1C_1}\right)=WL_1\left(1-\frac{W_0^2}{W^2}\right) \quad (1)$$

wherein $$W_0=2\pi f=\sqrt{\frac{1}{L_1C_1}} \quad (2)$$

is the angular resonant frequency of the above circuit $L_1$ $C_1$. The reactance *X* may further be written:

$$X=2\pi(f+s)L_1\left[1-\left(\frac{f}{f+s}\right)^2\right]=2\pi L_1\frac{s(2f+s)}{f+s} \quad (3)$$

Neglecting the frequency shift *s* with regard to the frequency *f*, relation (3) is reduced to the following relation:

$X=4\pi sL_1$ (4) Neglecting also the emitter resistance $h_{11}$ of transistor $Q_2$, the current $i_1$ circulating in the branch $R_1$ $C_1$ $L_1$ may be written $$i_1=\frac{V_1}{R+4\pi sL_1j} \quad (5)$$

wherein *R* is the total series resistance of the branch $R_1$ $C_1$ $L_1$. The voltages $V_L$ and $V_L$ induced in the secondary windings $L_2$ and $L_3$ of transformer T can be written $$V_{L_2}=-V_{L_3}=\frac{V_1 2\pi fL_1j}{(R+4\pi sLj)n} \quad (6)$$

*n* being the turns ratio between winding $L_1$ and each of the windings $L_2$ and $L_3$.

Calling *r* the total resistance of the circuit between the emitters of transistor pair $Q_3/Q_4$ ($Q_5/Q_6$), the current $i_2$ of the secondary loop may be written:

$$i_2=\frac{V_{L_2}}{r}=\frac{-V_{L_3}}{r} \quad (7)$$

Assuming that the forward transfer ratio of transistor $Q_1$ is equal to 1, i.e. that the collector current thereof is equal to its emitter circuit $i_1$ (AC component), the voltage $V_2$ is given by the following relation:

$$V_2=(i_1+i_2)R_2=\frac{V_1}{R+4\pi s_1L_1j}\left[1+\frac{2\pi fL_1J}{nr}\right]\cdot R_2 \quad (8)$$

and the total feedback ratio G can be written:

$$G=\frac{V_2}{V_1}=\frac{R_2}{R}\cdot\frac{1+\frac{2\pi fL_1j}{nr}}{1+\frac{4\pi sL_1j}{R}} \quad (9)$$

The condition of oscillation is:

$G=1$ (10)

giving rise to the following relations (11) and (12): $R_2=R$ (11) $f/nr=2s/R_2$ (12)

Physically, the conditions (11) and (12) may be interpreted as follows: If the resistance $R_2$ is equal to the resistance *R*, the oscillator will oscillate at a frequency which is either the tuned frequency *f* of the resonant circuit $L_1$ $C_1$ (in the absence of modulation) or a frequency $f+s$ such that $$s=\frac{R_2}{2nr}\cdot f \quad (12')$$

in the case of full modulation.

An important design feature, which is not determined by the above relations, is the quality factor *Q* of the branch $L_1$ $C_1$ $R_1$. Hereinafter it will be shown that for a given value of the relative frequency shift *S*/*f*, this quality factor *Q* determines the ratio G2/G1 between secondary feedback ratio G2 and the main feedback ratio G1. In other words, the factor *Q* determines the phase angle Φ corresponding to the frequency shift *s*.

The quality factor *Q* is given by the following relation:

$$Q=\frac{2\pi fL_1}{R} \quad (13)$$

The ratio G2/G1 may be written:

$$\frac{G2}{G1}=tg\ \phi=\frac{i_2}{i_1}=\frac{2\pi fL_1j}{nr} \quad (14)$$

Using relations (11), (12), and (13) in relation (14) it results: $tg\ \Phi=G2/G1=2\ s/f\ Q$. (15)

I claim:

1. A modulator comprising:

first means to provide an oscillator signal having a given frequency;

first and second voltage-to-current transducing circuits with paralleled outputs coupled to said first means;

second means to couple said oscillatory signal to the input of both said first and second circuits; and an ON-OFF input signal coupled to at least one of said first and second circuits to provide a control signal for application to said first means to shift said given frequency and thereby frequency modulate said oscillatory signal.

2. A modulator as claimed in claim 1, wherein the input of said second circuit is coupled to a fixed DC potential whose level is situated between the upper and lower levels of said ON-OFF input signal and that said circuits are intercoupled so as to be alternately effective depending on whether said upper or said lower level is applied.

3. A modulator as claimed in claim 2, wherein said first and said second circuits are fed by a source providing a substantially constant current.

4. A modulator as claimed in claim 3, wherein said source is coupled to said first and second circuits via respective decoupling means.

5. A modulator as claimed in claim 1, wherein said first and second circuits are alternately switched-ON under the control of said ON-OFF input signal.

6. A frequency modulated phase-shift oscillator arrangement comprising:

an oscillator having a main feedback loop to generate an oscillating signal having a given frequency;

a double balanced modulator controllable by an ON-OFF modulation input signal to add to the feedback signal of said main feedback loop a secondary signal which is substantially in quadrature with respect to said feedback signal;

said modulator including first and second voltage-to-current transducing circuits with paralleled outputs coupled to said main feedback loop, first means coupled to said main feedback loop to couple said oscillatory signal to the inputs of both said first and second circuits, and an input for said modulation input signal coupled to at least one of said first and second circuits to provide said secondary signal to shift said given frequency and thereby frequency modulate said oscillatory signal.

7. A frequency modulated phase-shift oscillator arrangement as claimed in claim 6, wherein said modulator is inductively coupled to said main feedback loop to modulate and transduce the induced voltage signals to corresponding current signals which are fed back to said main feedback loop.

8. A frequency modulated phase-shift oscillator arrangement as claimed in claim 6 wherein the output current signals from said first and second transducing circuits are in phase opposition with respect to one another and in quadrature with respect to the current signal of said main feedback loop.

9. A frequency modulated phase-shift oscillator arrangement as claimed in claim 6, wherein said oscillator incorporates a coil in its frequency determining circuit, and said first means includes at least one winding inductively coupled to said coil to feed said at least one of said first and second circuits.